United States Patent [19]

Kaufman, Jr.

[11] 4,048,530
[45] Sept. 13, 1977

[54] ELECTRIC MOTOR WITH PLASTIC ENCAPSULATED STATOR

[75] Inventor: George A. Kaufman, Jr., Avon, Conn.

[73] Assignee: The Superior Electric Company, Bristol, Conn.

[21] Appl. No.: 574,356

[22] Filed: May 5, 1975

[51] Int. Cl.² .............................................. H02K 5/00
[52] U.S. Cl. ....................................... 310/89; 310/43; 310/90
[58] Field of Search ...................... 310/43, 90, 254, 89

[56] References Cited

U.S. PATENT DOCUMENTS

| 2,814,744 | 11/1957 | Demetriou et al. | 310/43 |
| 3,256,590 | 6/1966 | Myers | 310/43 X |
| 3,319,093 | 5/1967 | Abdul | 310/43 X |
| 3,720,914 | 3/1973 | Hallerback | 310/90 X |
| 3,740,598 | 6/1973 | Hallerback | 310/89 X |
| 3,858,070 | 12/1974 | Hallerback | 310/43 X |

Primary Examiner—Donovan F. Duggan
Attorney, Agent, or Firm—Ernest M. Junkins

[57] ABSTRACT

An electric motor having a stator and a rotor in which the stator is formed with an encapsulating hardened plastic shell formed with a through aperture in which the rotor is positioned and which has portions that accurately concentrically support the motor with respect to the stator.

1 Claim, 5 Drawing Figures

ELECTRIC MOTOR WITH PLASTIC ENCAPSULATED STATOR

The present invention relates to an electric motor of the type having a stator that rotationally supports a rotor. Typical heretofore constructions of a stator have included a unitary stack of laminations having portions about which energizable windings are wound. A shell formed of three machined metal pieces, namely, a central tubular piece and two end bells, enclosed and were mechanically secured to the stator stack. Each end bell was formed with a hole for supporting a bearing which in turn rotatably supported the rotor with the axis of the rotor being concentric with the axis of the stator.

The stator and rotor have aligned torque producing portions with the radial distance therebetween sometimes being referred to as the air gap. Normally, a smaller air gap provides a more efficient and powerful motor while maintaining the air gap dimension within a small variation provides a consistency in operation. Hence, close control of the air gap dimension is usually required, especially in stepping motors. One factor that effects the air gap dimension is the accuracy of the coincidence of the stator and rotor axes. This in turn depends substantially on the preciseness at which the three parts of the stator shell are made and assembled. Thus, to provide a motor with a small air gap dimension within only a small tolerance, preciseness in manufacturing of the parts is required with a resulting increase in their cost while relaxing the air gap dimension and its tolerance may permit some reduction in manufacturing costs but yet would tend to cause a motor to be erratic in operation even to the degree of not being operable at all and also tend to produce increased inconsistency in operation between motors.

In attempting to obtain concentricity, it has heretofore been proposed to mechanically fit the metal rotor bearing support members to the stator stack in a manner that formed a cavity therebetween. Hardenable plastic material was then ejected to fill the cavity and bond the parts together. The assembly may then be machined to the desired dimensions as taught in U.S. Pat. No. 2,922,902. A similar teaching is disclosed in U.S. Pat. No. 3,742,595 where the parts are fitted and then adhesively secured together in an accurate relationship prior to filling the cavity with hardenable plastic material. Both teachings require substantial forming of the parts to obtain the necessary mechanical fit with the former requiring the steps of substantial subsequent machining and the latter, relatively precisely made parts and fixtures.

It is accordingly an object of the invention to provide an electric motor having a stator that supports a rotor in which the rotor bearing parts of the stator are quite inexpensive to manufacture and assemble but yet enables the rotor to be readily mounted in the stator with the coindence of their axes being closely maintained.

Another object of the present invention is to achieve the above object with a motor that is durable in use even over a relatively wide range of operating conditions and which is quite resistant to environmental deterioration.

A further object of the present invention is to provide a motor having a stator that includes an encapsulated plastic shell which is unitarily molded about the other stator parts with the plastic shell being the sole structure that supports the rotor bearing support members from axially shifting.

Still another object of the present invention is to achieve the above objects with only a small number of stator parts and in which only a few dimensions on the parts are required to be precisely dimensioned.

In carrying out the present invention of an electric motor, especially its stator construction, the stator includes a plurality of laminations of magnetic sheet material that are secured together to form a unitary stack. The laminations and hence the stack, are formed to have a plurality of inwardly directed poles with energizable windings wound about the poles. The stack and windings are then encapsulated by a hardenable plastic covering preferably by the use of a molding method known as transfer molding.

The encapsulated stator is formed with a through aperture in which the rotor is positioned. Adjacent each end of the aperture there is formed integrally with the plastic covering a means for supporting bearings which in turn support the rotor for rotational movement. In one embodiment the bearings are supported by the plastic material, in another embodiment by a pair of similarly shaped annular metal rings molded in place during the encapsulation to be integral with the plastic covering while in a further embodiment by dissimilarly shaped metal inserts at each end that are also molded in place during the molding operation.

The axis and the dimension of the through aperture with respect to the stator stack is capable of being quite precisely controlled even with or without metal inserts in each stator by forming the mold cavity throughout of precise dimensions. Thus, when a rotor is positioned within the aperture and supported by portions thereof, close coincidence of the rotor axis with the stator axis is consistently readily obtainable. Accordingly, by utilizing the encapsulating plastic covering material to not only provide protection of the stator stack but also to provide portions thereof for supporting the rotor, consistency in manufacturing motors of precise and durable construction is achieved quite economically.

Other features and advantages will hereinafter appear.

In the drawing

Figure 1:
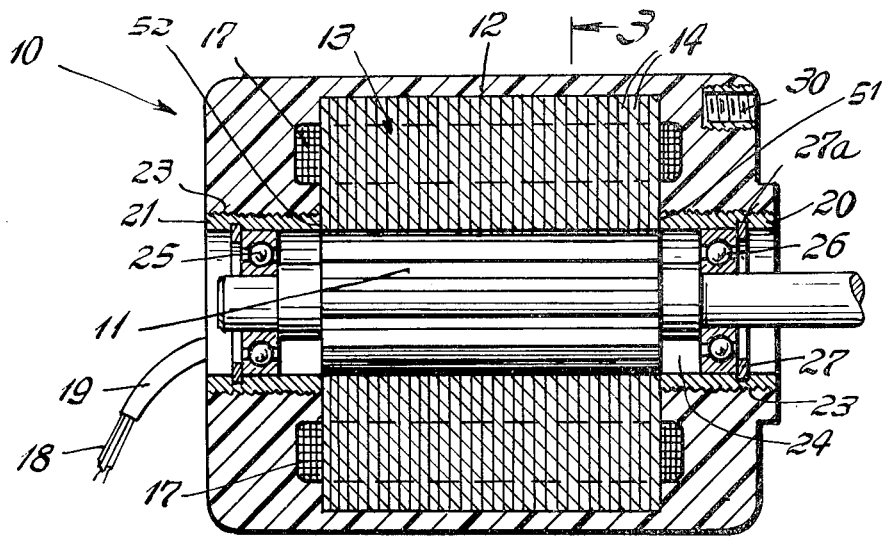
FIG. 1 is an axial section of an electric motor constructed according to the present invention.
Figure 2:
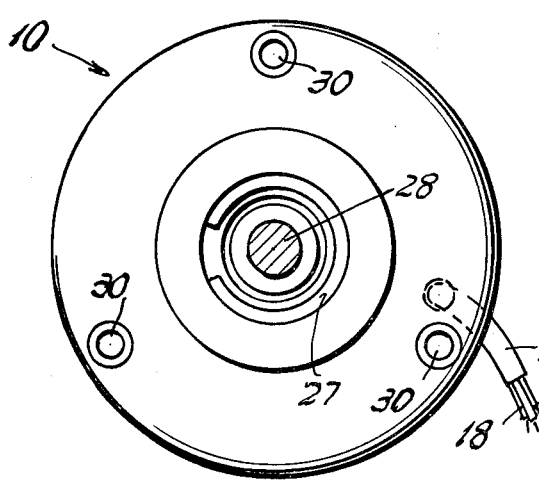
FIG. 2 is an end view thereof.
Figure 3:
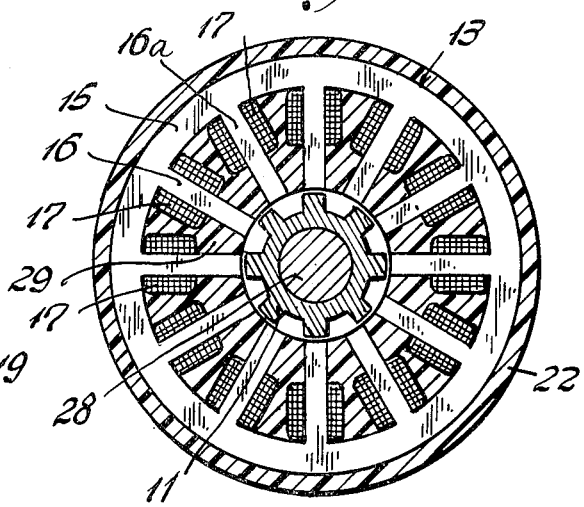
FIG. 3 is a diametric section taken on a line 3—3 of FIG. 1.

Referring to the drawing and the embodiment of a motor shown in FIGS. 1 through 3, the motor is generally indicated by the reference numeral 10 and includes a rotor 11 and a stator 12. The stator includes an elongate stack 13 of individual laminations 14 with each lamination having the planar shape shown in FIG. 3 which consists of an outer circular portion 15 and inwardly extending poles 16. The laminations are secured together in any convenient manner as by riveting, adhesion, welding, etc., to unify the stack. An energizing winding is wound about each of the poles such as a winding coil 17 wound about the pole 16a. Exterior leads 18 are connected to the ends of the winding coils and are secured together by a wrapping of a short length of electrical insulating tape 19. One other operation performed to complete the stator stack 13 which has been found desirable is to grind or otherwise accurately dimension the diameter of the bore defined by the inner faces of the poles. The accuracy of the diameter may, for example, be within a tolerance of ±0.00025 inches.

The stator stack 13 is then placed within a splitable mold cavity shaped to provide the exterior shape which the stator is desired to have and the mold includes a one or two piece mandril which fits within the bore of the stator stack. In addition, metal annular rings such as rings 20 and 21 are also positioned on the mandril within the cavity. A hardenable plastic material is then injected under pressure into the cavity, preferably by a transfer molding operation, to fill the cavity and encapsulated the stator stack. The material is then subsequently hardened to form a plastic shell of covering 22.

The exterior surface of the inserts 20 and 21 are somewhat roughened as by knurling on an exterior surface 23 thereof so that the plastic material adheres to the inserts to cause them to be unitary with the plastic shell. As with the bore in the stator stack, the inner diameter of the inserts are accurately formed within a small dimensional tolerance.

Upon the plastic material becoming hardened, the rotor 11 is positioned within a through aperture 24 of the stator that is created by the mandril of the mold. Bearings 25 and 26 that rotatively support the rotor are placed in the inserts with the bearings closely mating with the interior surfaces of the inserts 20 and 21 to be supported thereby. A spring ring 27 which cooperates with an annular groove 27a in the insert 20 maintains the bearing 26 against outward axial movement while a larger diameter portion 28 of the rotor shaft bears against the bearing to limit movement in the other axial direction. The other end of the motor is similarly constructed with a spring ring, annular groove and larger rotor shaft portion.

Accordingly, by simply inserting the rotor with the bearings into the stator through apertures and positioning the spring rings, a motor is completed with the assurance that the portions of the covering 22 supporting the bearings by way of the metal inserts will supports the bearings in a position which essentially causes precise coincidence between the rotor axis and the stator axis.

It will be appreciated that in the forming of the plastic shell 22, the plastic material will be caused to flow by being under pressure into any open space in the cavity and this includes the portion 29 located in the space between adjacent poles. Thus the stator stack is completely covered by the plastic material leaving no voids, except for the inner faces of the poles which are in contact with the mandril of the mold. The inner faces of the poles together with the inner faces of the portions 29 accordingly define the through aperture 24 in which the rotor 11 is positioned and by portions of which it is supported.

The through aperture 24 of each motor is caused to have a diameter that is within a small tolerance range of the diameter of the mandril in the mold by the mandril being precisely made to have a diameter that is a close fit with the closely dimensioned holes in the insert and stator stack. If desired, as a further step, the through aperture may be sized by machining closely to a diameter dimension after the covering has hardened. This may be in addition to or eliminate the need for sizing of the holes in the stack and inserts prior to molding.

It will be understood that while the embodiment of the motor shown in FIGS. 1 through 3 includes the annular inserts 20 and 21, if desired, the inserts may be eliminated and the bearings supported directly by the covering material defining the aperture adjacent the ends of the aperture. In this construction, the spring ring retaining grooves, such as the annular groove 27a would have to be cut or otherwise formed in the covering material.

Figure 4:
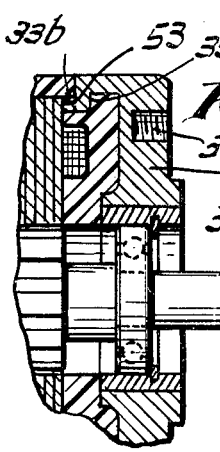
FIG. 4 is a portion of an axial section showing another embodiment of an insert that may be used.

To enable the motor to be mounted in use, a plurality of tapped screw holes, such as screw hole 30, may be formed in one end of the plastic shell. On the other hand, as shown in FIG. 4, a metal insert, such as insert 31 having a larger outer diameter than the inserts 20 and 21 may be employed and the tapped holes formed in the insert as indicated by the tapped hole 32. The insert 31 is made integral with the covering material by both adhesion and by mechanical interlocking by way of an undercut 33a formed in its back surface and a plurality of notches, such as the notch 33b that are spaced about the periphery of the insert. A motor may have both inserts like the insert 31 or may have one insert like 31 and the other like inserts 20 and 21, if desired, without departing from the present invention.

Figure 5:
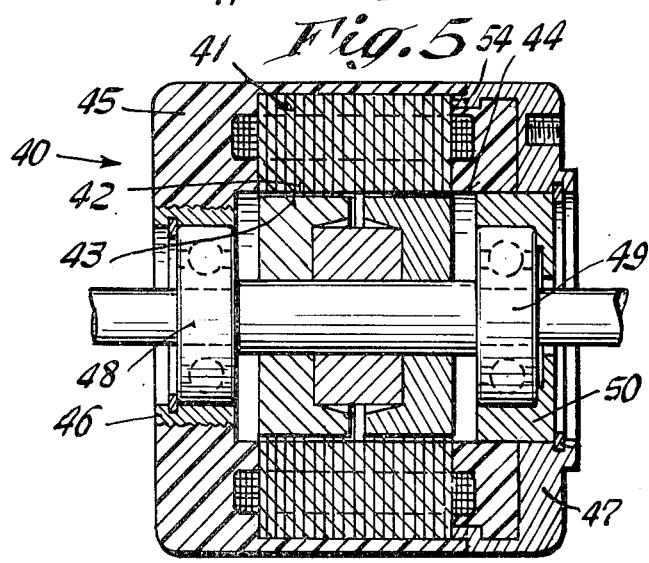
FIG. 5 is an axial section of another embodiment of a motor made according to the present invention.

Shown in FIG. 5 is a somewhat different form of electric stepping motor 40 with the motor in this instance having configurations of the stator stack and rotor such as is found in stepping motors sold under the trademark "SLO-SYN" by the assignee of the present invention. Specific details thereof are not shown and reference is made to U.S. Pat. Re. No. 25,445, assigned to the assignee of the present invention, for disclosure of a typical construction thereof. In the motor 4, the stator stack 41 is formed to have a plurality of toothed poles whose inner surfaces define a bore 42 in which a rotor 43 is positioned. A through aperture 44 is formed in the encapsulating plastic shell 45 with an annular insert 46, similar to the insert 20, being secured at one end of the stator by the plastic material. The other end of the stator utilizes a metal insert 47 similar to the insert 31. A bearing 48 supports the rotor in the insert 46 and a similar size bearing 49, by way of an adapter ring 50, is supported by the insert 47.

With this construction the mold mandril will, of course, be required to have two diameters, one for mating with the insert 46 and the other for mating with the insert 47 and the hole defined by the pole faces of the stator stack. The insert 47 is formed to be positively secured to the plastic covering 45 in the same way as the insert 31. Further, the covering material flows between the toothed poles and along the teeth valleys to fill all voids in the same manner as the portions 29 in the prior embodiment.

In all embodiments of the invention heretofore disclosed the stator is formed with a through aperture which is precisely positioned with respect to the stator stack by way of a mandril in the molding cavity and the interior surface of the through aperture is formed to accurately receive means for supporting the rotor. Thus, assurance is obtained that in assembling each motor, substantial coincidence between the rotor axis and the stator axis will be inherently attained.

It will be noted that both bearings in the motors shown are of the same size. If desired they may be of different sizes with one possible effect being the elimination of the adapter ring 50 if a bearing having the same outside diameter as the inside diameter of the hole in insert 47 is available and used.

One form of thermo setting plastic material that has been found satisfactory for forming the plastic covering is presently available from Pacific Resin and Chemicals, Inc., Milwaukee, Wisconsin and identified as EMC 707. It is a short glass fiber filled epoxy molding material having physical properties of (1) Impact Strength (ft. lbs./in.notch)—0.52; (2) Flexural Strength (psi)—19.900; (3) Flexural Modulus (psi)—$1.7 \times 10^6$; (4) Tensile Strength (psi)—12,800; (5) Compressive Strength (psi) —33,000; (6) Heat Distortion Temperature (° F at 264 psi)—240; (7) Heat Resistance (continuous ° F)—450; (8) Weight Loss (%400° F for 100 hrs.)—1.37; (9) Thermal Expansions (in/in/C $\times 10^5$)—2.05; (10) Thermal Conductivity (cal/sec/cm$^2$/° C/cm $\times 10^4$)—20.0; (11) Water Absorption (% 48 hrs, at 50° C)—.13; (12) Shore D Hardness 98; (13) Specific Gravity (g/cc)—1.98; (14) Bulk Factor —1.93; (15) Mold Shrinkage (in/in)—0.006; (16) Flammability —S.E.; (17) Shelf Life at 75° F—4 months; (18) Fungus Resistance —nonsupporting.

Its electrical properties are asserted to be (1) Volume Resistance (ohm/cm)—$1.0 \times 10^{16}$; (2) Surface Resistance (ohms) —$1.0 \times 10^{16}$; (3) Dielectric Constant (1KC)—3.10; (4) Dissipation Factor (1KC)—0.005; (5) Loss Factor (1KC)—0.0155; (6) Power Factor (1KC)—0.005; (7) Arc Resistance (seconds)—210; (8) Dielectric Strength (short time-volts/mil)—800.

It is further noted that the material has a molding temperature of 300–350° F.

A stator encapsulated with such a covering material enables a motor, shown essentially full size in FIGS. 1-3, to be consistently produced with an air gap of 0.002–0.003 inches based upon the diameter of the aperture in the stator stack being within a ± 0.00025 tolerance and with the rotor diameter differing by -0.005 to -007 inches from the stack aperture diameter. Moreover, when an encapsulated stator was subjected to a number of cycles between temperatures of -10° C and +95° C, the interior surface of the insert was found to have shifted at a maximum of less than 0.001 inches, while the internal diameter of the through aperture changed less than 0.0002 inches. Thus, a stator constructed according to the present invention does not alter significantly the concentricity of the support of the rotor even over a wide temperature range.

While the inserts must have a minimum axial width, the actual width is basically determined by the shape of the mold cavity and mandril. The inserts and stator stack when placed in the cavity should be held against axial movement to assure proper axial positioning of the rotor. Normally, the outer edge of each insert engages an end of the cavity while the inner edge of each insert is made to abut the mandril (for the insert 46) or abut the stator stack as at 51 for the insert 20, 52 for the insert 21, 53 for the insert 31 and 54 for the insert 47.

The thickness of the covering is basically not critical provided, however, that it is sufficiently thick to provide the necessary mechanical integrity and thermal strength of the covering. A thickness of the circular portion about the stator stack, approximately as shown in FIGS. 1-3, has been found satisfactory. Though if too thick, heat dissipation through the covering may require the motor to operate at lower power. However, with the motor shown, essentially the same power may be obtained as with a shell formed of a plurality of metal parts, when the motors are similarly mounted for similar heat dissipation.

In all embodiments of the invention, the rotor bearing portions, either the covering material or inserts are held in position at least against movement perpendicular to the motor axis solely by the covering material. Thus the necessity for machining or forming the inserts and/or stator stack to have cooperating mating surfaces is eliminated.

While the words encapsulating or covering are used herein, it is contemplated that, if desired, the circular portion about the stator stack may be eliminated and thus the words are to be construed as including a stator without such a portion. In such a stator as with the stator described, the portions, like the portions 29 that fill the voids between the poles, provide the structural interconnection between the portions of the covering that support the rotor bearings, either directly by the covering material or by way of the metal inserts.

It will accordingly be understood that there has been disclosed an electric motor having a stator and rotor in which the stator includes an encapsulating hardened plastic covering. The covering is unitary throughout and formed with a through aperture in which the rotor is positioned. Portions of the aperture, either with or without metal inserts that are made integral with the covering, support the rotor to assure quite precise concentricity of the rotor and stator axes. In this manner not only is the motor of the present invention capable of being economically manufactured but also maintenance of the concentricity within a small range for each motor is consistently obtained.

Variations and modifications may be made within the scope of the claims and portions of the improvements may be used without others.

I claim:

1. An electric motor comprising a stator and a rotor; said stator including a tubular stack of laminations having an axis, winding means positioned on said stack and a hardened plastic covering encapsulating said stack and windings and being formed to provide a through opening aligned with the stack axis; said rotor having portions disposed within the opening and an axis; and support means positioned at each end of the stack including means integral with the plastic covering for supporting the rotor essentially coaxially in the stator and means for securing the integral means to the hardened plastic covering with the covering constituting the sole structure for securing the integral means to the stack to prevent movement of the integral means transverse to the axis of the stator stack and outwardly therefrom, in which the integral means of the support means includes at least a metal insert formed with a through hole positioned adjacent an end portion of the opening and being adhered to the covering, in which the insert has an inner surface transverse to the axis, in which the stator stack has an adjacent surface and in which the inner surface and the adjacent surface abut at the outer periphery of the stack and insert, in which the insert includes a substantial exposed portion extending diametrically along one end surface of the stator, in which the insert and covering are formed to have cooperating mechanically interlocking portions, in which the support means includes another insert having an inner surface transverse to the stator axis, in which the stator stack has an adjacent surface transverse to the stator axis, in which the inner surface of the another insert and its adjacent stack surface are spaced apart with covering material being positioned therebetween for solely supporting the insert, in which the stator stack is formed to have inwardly extending poles having inner faces that define a portion of the through opening, in which the poles are spaced from each other, in which the covering material fills the spaces between the poles to occupy all of the interior of the stator that is unoccupied by the other parts of the stator, in which the covering material in the spaces extends for the complete length of the stator stack to interconnect both support means, in which the support means further includes a bearing positioned adjacent each end of the through opening for rotatably supporting the rotor and in which there are cooperating means on the stator and rotor for limiting axial movement of the rotor with respect to the stator.

* * * * *